United States Patent
Brown

(10) Patent No.: US 7,048,483 B2
(45) Date of Patent: May 23, 2006

(54) LOW RIDING ATV TRANSPORTER FOR SHORT BED PICKUPS

(76) Inventor: Bill Wesley Brown, 11456 W. Colony St., Boise, ID (US) 83709

( * ) Notice: Subject to any disclaimer, the term of this patent is extended or adjusted under 35 U.S.C. 154(b) by 79 days.

(21) Appl. No.: 10/677,026

(22) Filed: Jun. 21, 2004

(65) Prior Publication Data

US 2005/0281629 A1    Dec. 22, 2005

(51) Int. Cl.
B60P 3/07    (2006.01)

(52) U.S. Cl. .............. 410/27; 410/30; 296/3; 224/403; 414/537

(58) Field of Classification Search ............ 296/182.1, 296/26.01, 26.012, 3, 10; 410/4, 8, 24, 30; 414/477, 478, 479, 480, 537, 538, 539, 462, 414/464, 571, 522, 548, 430; 224/402, 403, 224/405, 309, 310, 311, 329
See application file for complete search history.

(56) References Cited

U.S. PATENT DOCUMENTS

| | | | | |
|---|---|---|---|---|
| 4,874,284 A | * | 10/1989 | New, Jr. | 414/537 |
| 5,494,393 A | * | 2/1996 | Schrunk | 414/537 |
| 5,553,762 A | * | 9/1996 | Brown | 224/403 |
| 6,371,719 B1 | * | 4/2002 | Hildebrandt | 414/537 |
| 6,533,337 B1 | * | 3/2003 | Harshman et al. | 296/26.08 |

* cited by examiner

Primary Examiner—H. Gutman

(57) ABSTRACT

The purpose of this invention is to carry two ATVs on a short bed pickup. The platform is designed so that each ATV straddles a side of the bed. ATVs rest almost 10 inches lower than most ATV racks for lower center of gravity and added stability. The wheels drop into an opening that restricts movement from front to back and from left to right. One person can assemble the parts by themselves. ATVs can be driven onto support platform on back of truck on a ramp angled at approximately 30 degrees. Wind resistance is reduced because ATVs are facing forward. Driver can still see behind vehicle through rear view mirror because of space between ATVs. Platform design allows for storage underneath the ATVs. Parts can be integrated for storage in a space approximately 102" long, 24" high, and 24" deep.

22 Claims, 7 Drawing Sheets

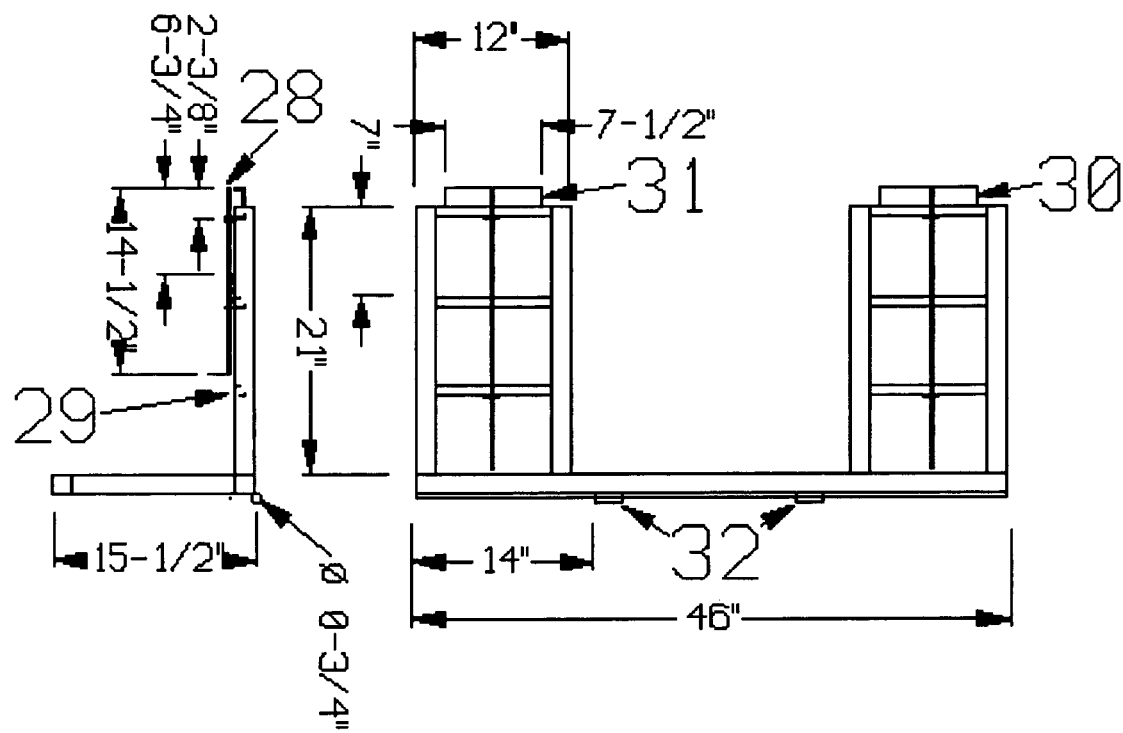
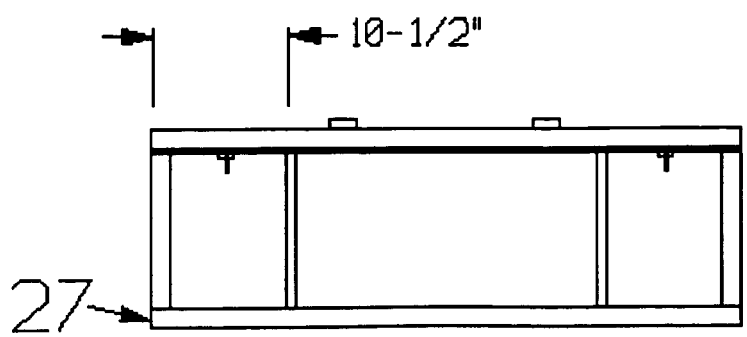
FIG. 4

SIDE VIEW TOP VIEW
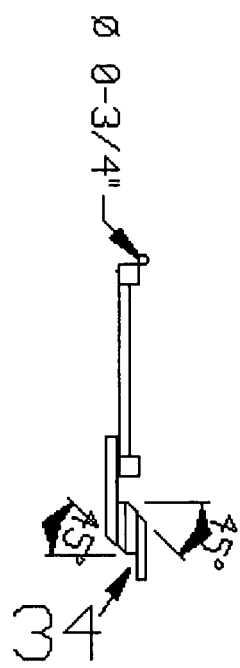
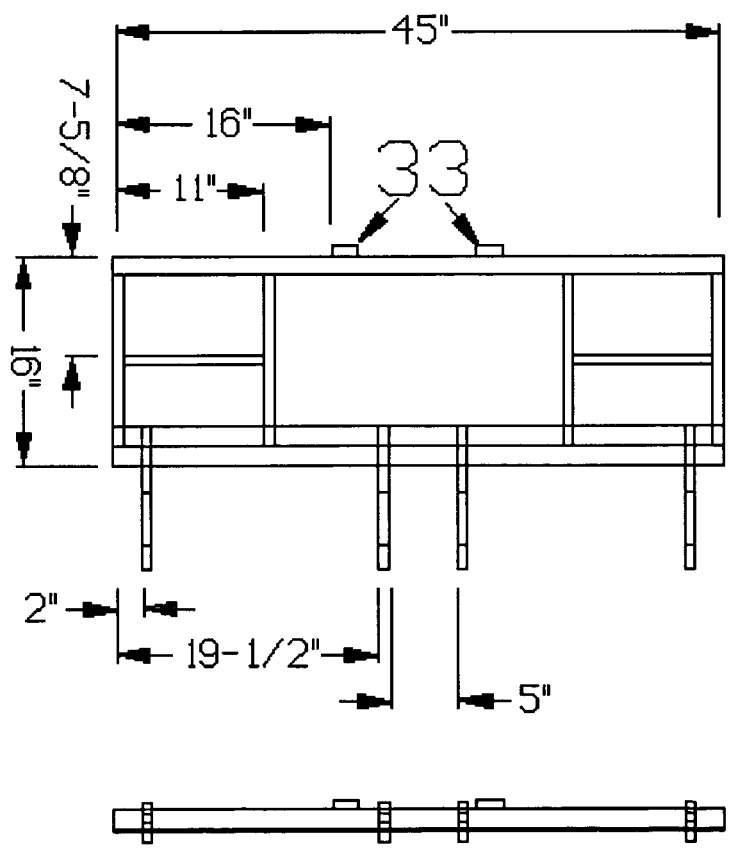
FRONT VIEW
FIG. 5

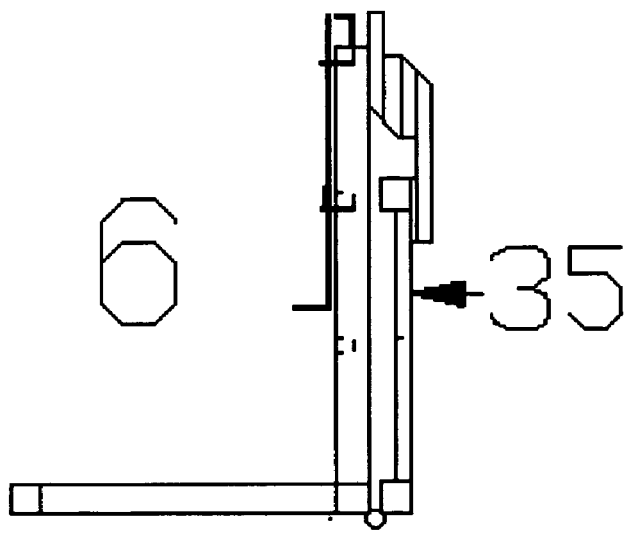
FIG. 6
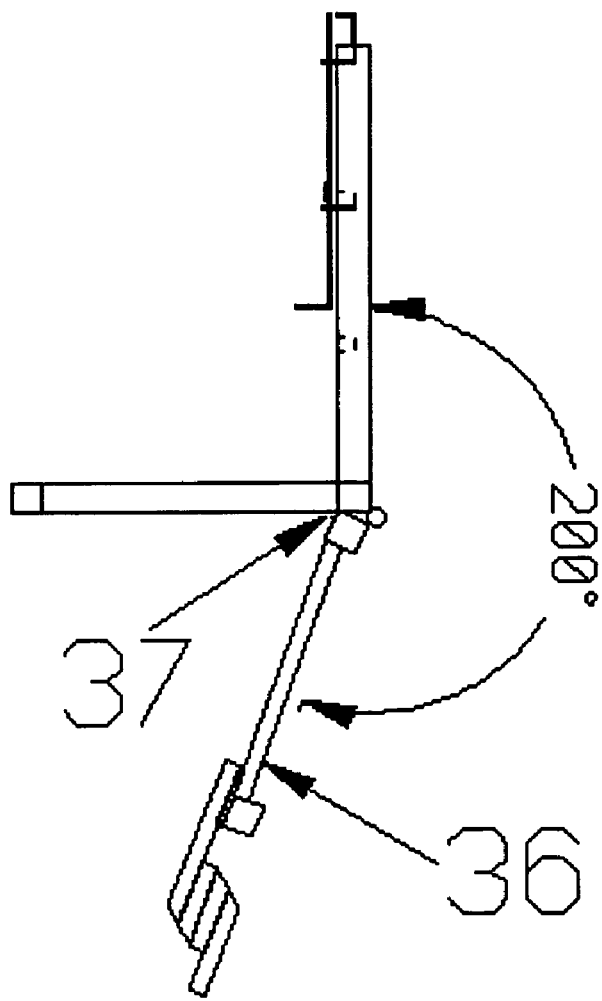

LOW RIDING ATV TRANSPORTER FOR SHORT BED PICKUPS

DESCRIPTION OF INVENTION

A. PRIOR SOLUTIONS AND THEIR DISADVANTAGES (IF AVAILABLE, ATTACH COPIES OF PRODUCT LITERATURE, TECHNICAL ARTICLES, PATENTS, ETC.)

Other solutions are available for long bed pickups to drive two four-wheelers up on top of the bed. The platform puts the four wheelers approximately four inches above the truck bed sides. The platform is usually connected to the truck but because of the high center of gravity the truck leans from side to the side. Most of the solutions extend beyond the end of the truck bed and can interfere with a trailer pulled behind the truck. Some of the solutions can be adapted to short bed pickups but are generally not transferable.

B. PROBLEMS SOLVED BY THE INVENTION

Two four wheelers can be carried on a short bed truck
Carrying four wheelers in the back of the truck does not increase risk of tipping
A crane is not necessary to load and unload the support structure from the back of the truck
Operator is not required to drive the four-wheeler up such a steep angle
Reduced risk of driving off the platform
Less space is required to store the platform when not in use

C. ADVANTAGES OF THE INVENTION

Advantages of the invention over what has been done before
ATVs sit almost 10 inches lower than most ATV racks for a lower center of gravity and added stability
Wheels are constrained in position to minimize movement during transit
One person can assemble the parts by themselves
Driver can still see behind vehicle through rear view mirror because of space between ATVs
Parts can be integrated for storage in a smaller amount of space—102"×24"×24"
Advantages of the invention also seen on other solutions
ATVs can be driven onto support platform on back of truck at an angle that is no more than 30 degrees
Reduced wind resistance because ATVs are facing forward
Allows for storage underneath the four wheelers

D. BRIEF DESCRIPTION OF THE DRAWINGS

Figure 1:
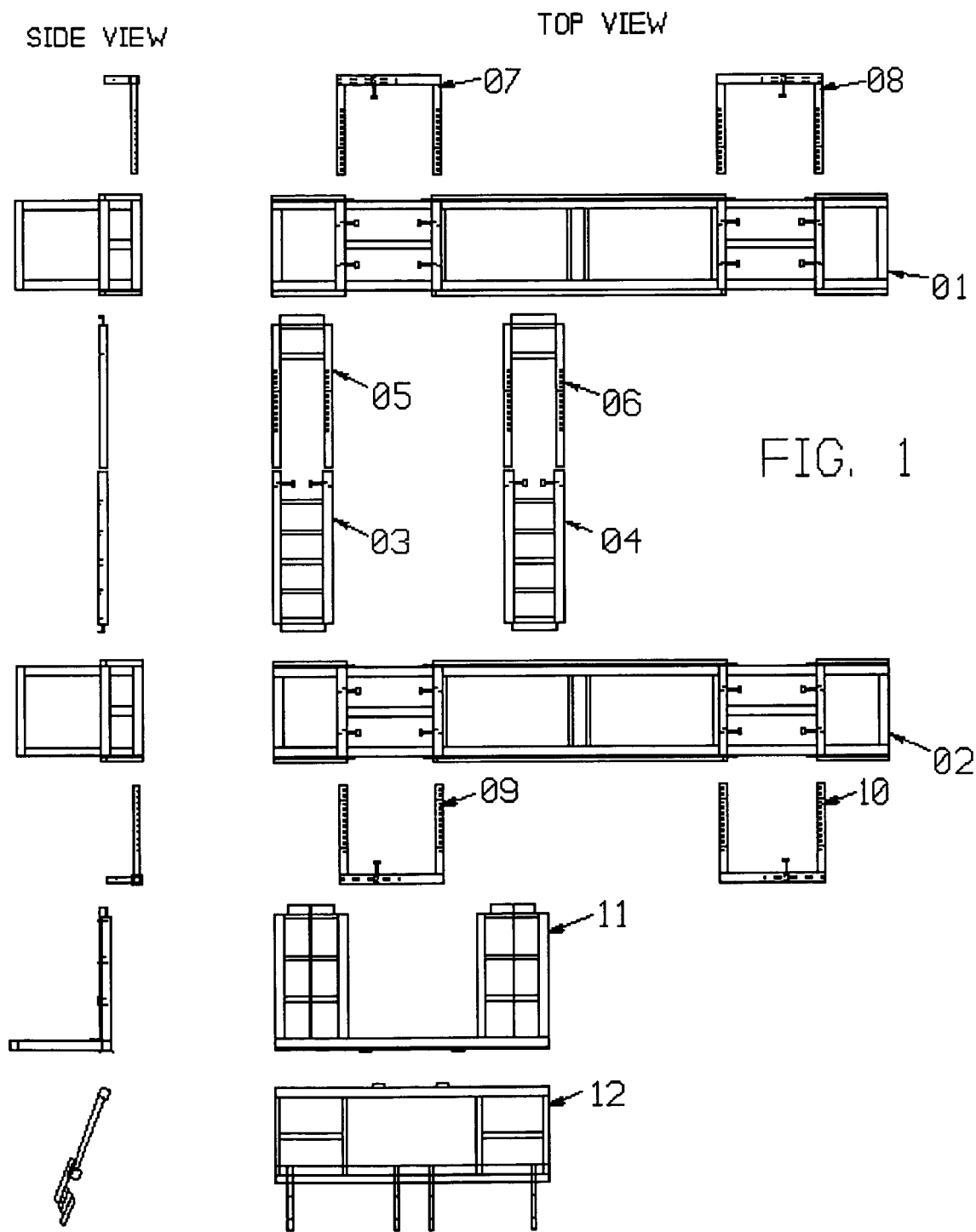
Figure 2:
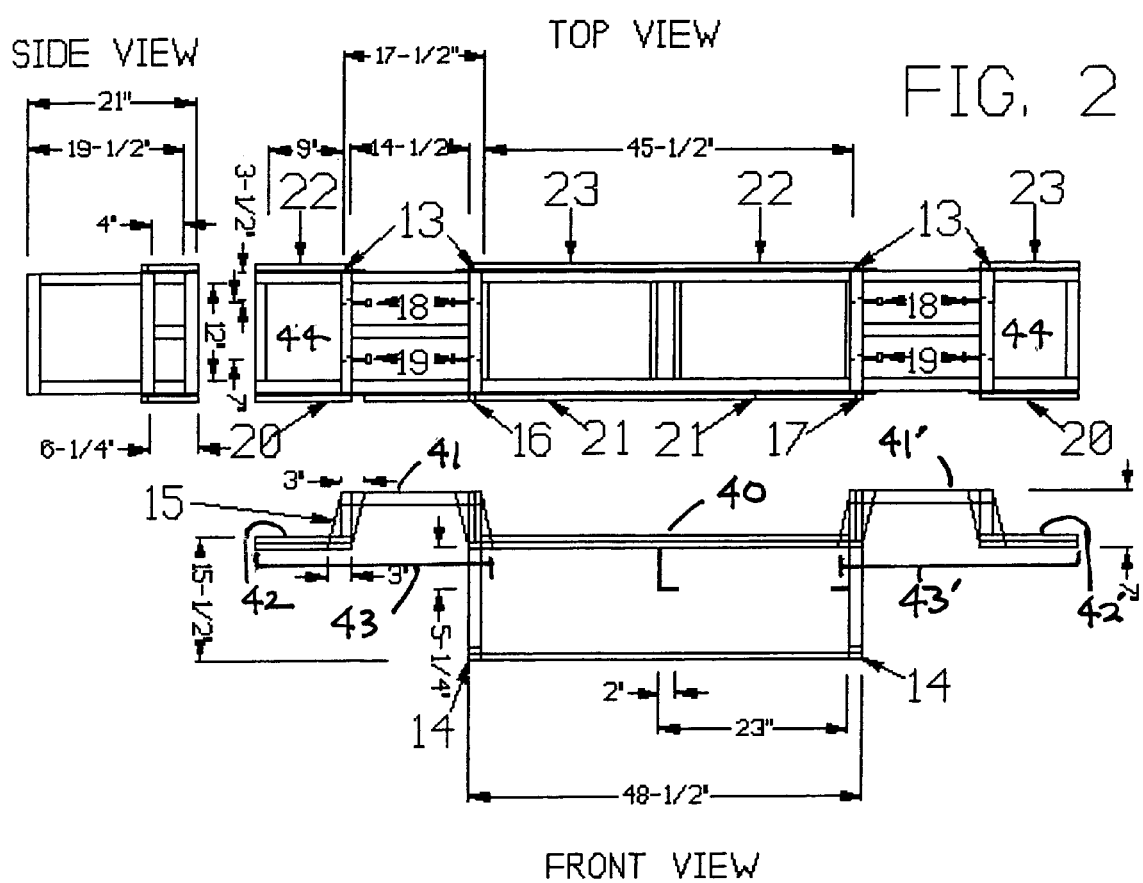
Figure 3:
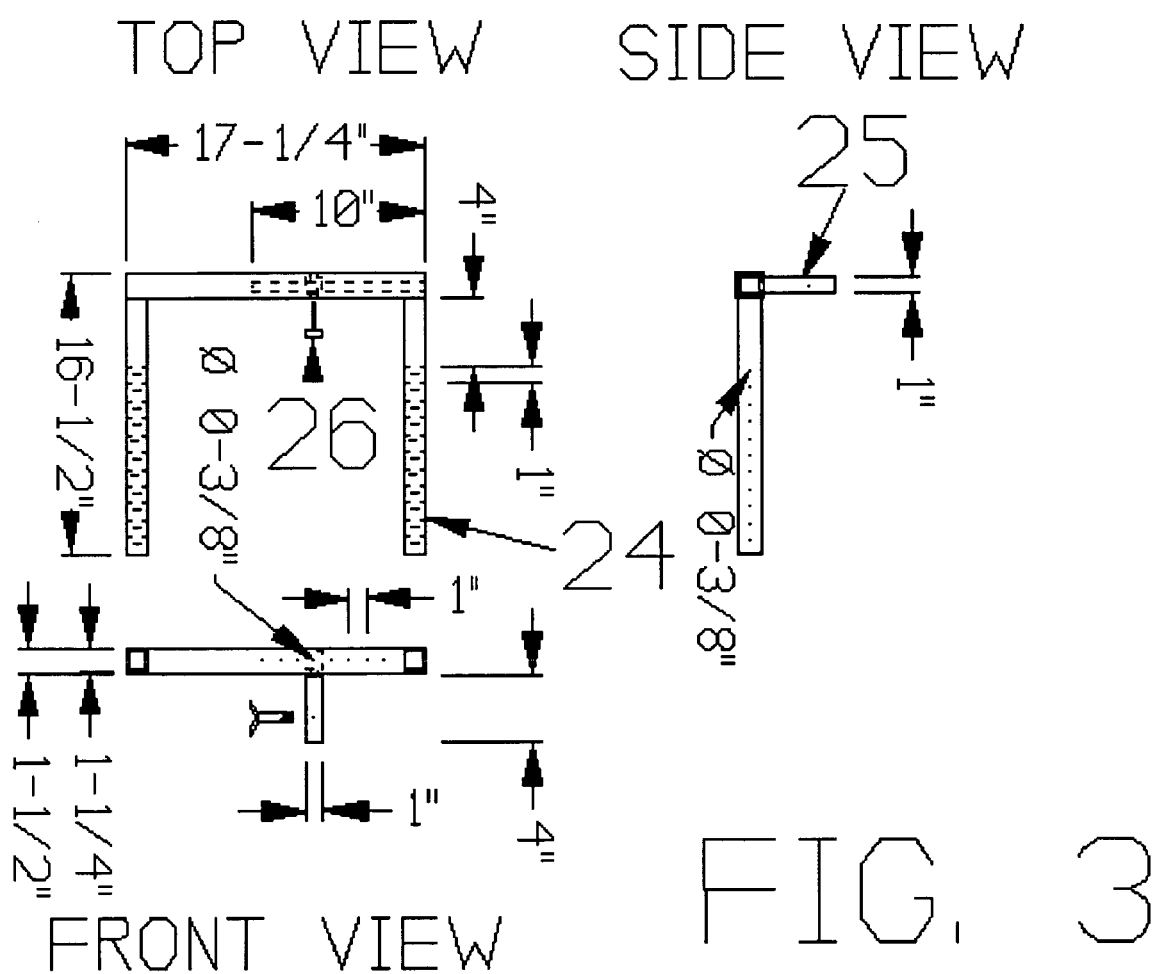
Figure 7:
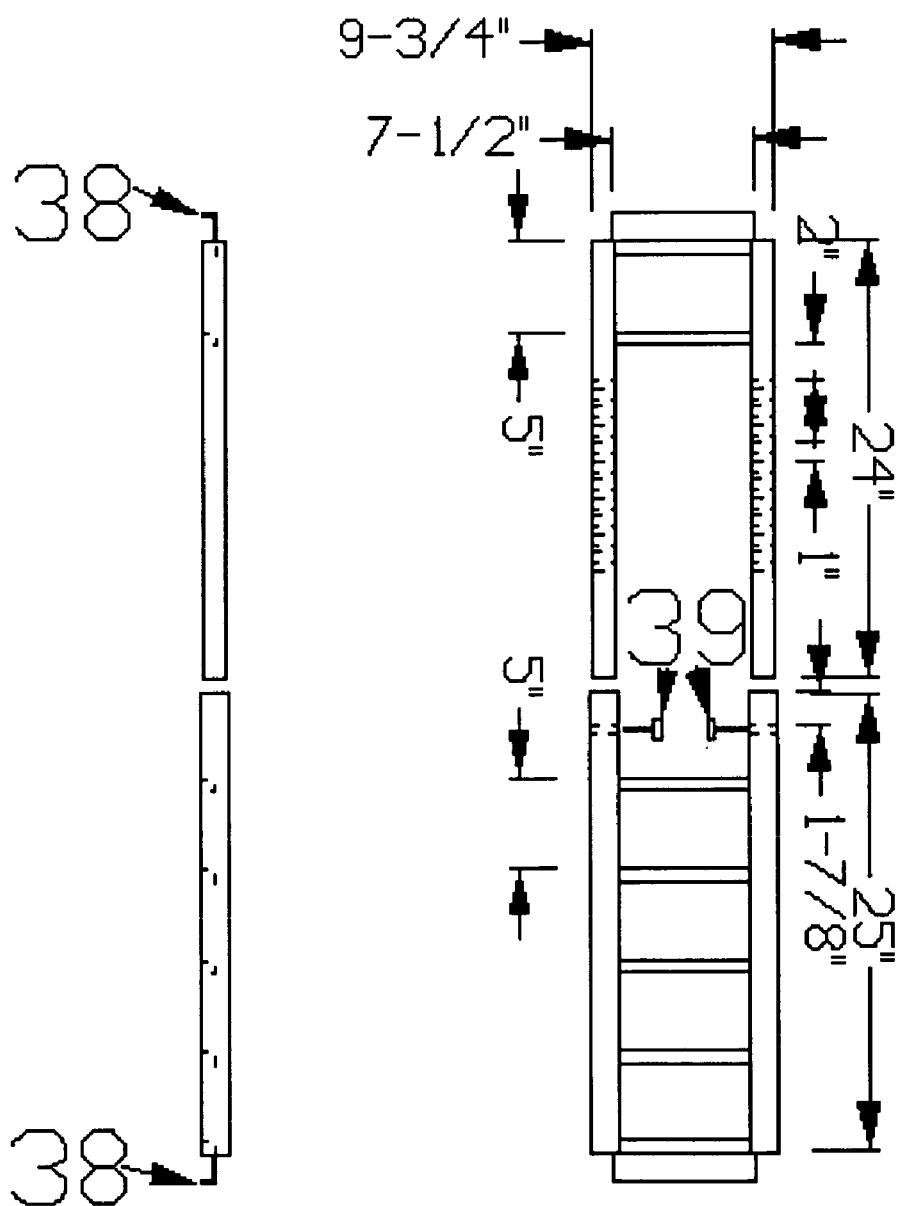

FIG. 1 is a computer aided drawing of the top view showing how all the parts are assembled.
FIG. 2 is a computer aided drawing of the top, front, and side view of the main platform.
FIG. 3 is a computer aided drawing of the top, front, and side view of the adjustable anchors used to custom fit the distance between the front and back main platforms and the position of the anchor posts from left to right.
FIG. 4 is a computer aided drawing of the top, front, and side view of the tailgate extension, which allows the ATV to clear the end of the truck bed and gradually raise the ATV to the level of the platform
FIG. 5 is a computer aided drawing of the top, front, and side view of the ramp extension which is hinged to the tailgate extension (FIG. 3) and physically ties the ramp and the rest of the structure together.
FIG. 6 is a computer aided drawing of the top, front, and side view of the ramp extension at the end points of the hinge for a total travel angle of 200 degrees.
FIG. 7 is a computer aided drawing of the top, front, and side view of the runner that connects the main platform piece (FIG. 1) on the back to the main platform piece (FIG. 1) on the front and allows a track for the wheels to transfer from the back to the front as the ATV is driven onto the platform.

E. DESCRIPTION OF THE INVENTION

The purpose of this invention is to carry two ATVs on a short bed pickup while keeping the center of gravity as low as possible and minimizing the amount of movement of the ATVs. The platform has been constructed of five unique parts. The five unique parts are assembled in the bed of the truck to form a platform that spans the truck bed and a ramp to drive up to the platform. The platform is designed so that each ATV straddles a side of the bed with two wheels outside of the bed and the other two wheels resting inside the bed of the truck.

Referring to FIG. 1, one main platform 01 is laid across the front of the truck bed. A second main platform 02 is laid across the back of the truck bed. 01 and 02 are identical pieces just rotated 180 degrees. 01 and 02 are shown in detail in FIG. 2. Two runners 03 and 04 are positioned in either the two left positions or the two right positions. The two runners are identical and are shown in detail in FIG. 7. Runner extensions 05 and 06 make it possible to adjust the distance between the two platforms 01 and 02. Adjustable anchors 07 and 08 are inserted into the front of the front main platform 01. Adjustable anchors 09 and 10 are inserted into the back of the back main platform 02. 07 and 10 are mirror images of 08 and 09 shown in detail in FIG. 3. The tailgate extension 11 (details described in FIG. 4) is supported by the tailgate and attached to the main platform 02. The ramp extension 12 (details described in FIG. 5) is hinged to the tailgate extension 11 and interconnected with an after market six foot folding ATV ramp not shown.

Referring to FIG. 2, one main platform is laid across the front of the truck bed with the open holes at 13 facing forward. A second main platform is laid across the back of the truck bed with the open holes at 13 facing backward. Each platform has a central top lowered part 40, two raised parts 41, 41' with each raised part being adapted to cooperate with and straddle the top of a truck bed side, and two outside lowered parts 42, 42', with both the central and outside lowered parts being adapted to receive and support the wheels of vehicles to be carried on the carrier. The main platforms are supported by the bed of the truck with central downwardly extending part 14. No weight is put on the bed rails. 15 is a ⅛" plate cut to support the sidewardly extending cantilevered parts 43, 43' of the main platform. The ⅛" plates at 13 have a square hole cutout so that the adjustable anchors (FIG. 3) can be inserted. 16 and 17 are space fillers acting as a foot support to keep the parts level when the parts are stored. ¼" round pins 18 and 19 locks the adjustable anchor (FIG. 3) in place. 38 (FIG. 7) connects the runner to 20 or 21. 30 and 31 (FIG. 4) connect the tailgate extension to 22 and 23, respectively. The wheels of an ATV drop into an opening 44 that restricts movement from front to back and from left to right.

Referring to FIG. 3, two adjustable anchors are inserted into the open holes at 13 (FIG. 2) on the front of front main platform and two more adjustable anchors are inserted into the open holes at 13 (FIG. 2) on the back of the back main platform. 24 must have an outside diameter small enough to fit inside hole at 13 (FIG. 2). The adjustable anchor pieces can be adjusted so that the anchor post 25 fits into the post holes on the bed rails of the truck of varying widths. The anchor post 25 is removeable since not all trucks have post holes in the bed rails that are accessible (e.g., trucks with bed liner inserts). The anchor post 25 can be locked in place by inserting a ¼" pin 26 through ⅜" holes in the adjustable anchor spaced 1" apart. The adjustable anchor pieces can also be adjusted to position the two platforms at a distance from each other that is equivalent to the distance between the front and back tires of the ATV being supported. Pins 18 and 19 (FIG. 2) are used to lock the adjustable anchor a distance from the other main platform equal to the distance between the front and back wheels.

Referring to FIG. 4, the tailgate extension connects to the back main platform and is supported by the tailgate at 27. The ramp extension is positioned on the left or right depending on which unit is being loaded. The ramp extension allows the ATV to clear the end of the truck bed and gradually raise the ATV to the level of the platform. A spring loaded ¼" rod 28 holds the ramp extension in place. The ¼" rod 28 has a 90 degree bend at the end that acts as a handle that can be hooked at 29 while putting the ramp extension in place and released when put in place. The rod should be able to spin freely. The spring supports a travel distance of 1.75" with a force of less than 5 lbf. 30 and 31 connect the tailgate extension to 22 and 23 (FIG. 2), respectively. The tailgate extension is hinged at 32 to the ramp extension 33 (FIG. 5) with a ½" diameter pin that is 4.5" long. The head of the pin can only be ¾" in diameter, so that the bolt can spin freely. The bolt is inserted through the cylinder on the tailgate extension at 32 and through the mating cylinder on the ramp extension at 33 (FIG. 5) and held in place with a cotter pin.

Referring to FIG. 5, the ramp extension is hinged at 33 to the tailgate extension (FIG. 4) so that the ramp extension is physically connected to the ramp and the rest of the structure. The end of the ramp extension at 34 is designed to interlock with an after market six foot folding ramp. The ramp extension along with the after market six foot folding ramp allows the ATV to be loaded at a similar angle to using the same after market six foot folding ramp to drive into the bed of a truck (approximately 30 degree incline).

Referring to FIG. 6, the ramp extension (FIG. 5) can be in two positions when hinged to the tailgate extension (FIG. 4). Position 35 is for moving the tailgate and ramp extension while connected. Position 36 is where it will be located to connect to the after-market ramp. 37 is a ¼ rod positioned just below the ramp extension when in position 36 so the hinge is not bearing all the load.

Referring to FIG. 7, two runner pieces connect the back main platform piece (FIG. 2) to the front main platform piece (FIG. 2). 38 connects the runner to 20 or 21 (FIG. 2) on the main platform. The runners allow a track for the wheels to transfer from the back to the front as the ATV is driven onto the platform. The runners can telescope to fit the exact length between the front main platform (FIG. 2) and the back main platform (FIG. 2). The runner can be locked in place by inserting a ¼" pin 39 through ⅜" holes in the runner spaced 1" apart. The two pieces are transferred from the left position to the right position depending on which unit is being loaded.

What is claimed is:

1. A vehicle carrier for a pickup truck bed, the truck bed having two sides with each side having a top, and the truck bed having a tailgate, the carrier comprising:
   a first platform for laying across about the front of the truck bed, the first platform having a central downwardly extending part which contacts and is supported by the truck bed bottom, but the first platform not being supported by any said truck bed side, the first platform having two sidewardly extending cantilevered parts, one of said cantilevered parts extends out over each truck bed side;
   a second platform for laying across about the back of the truck bed, the second platform also having a central downwardly extending part which contacts and is supported by the truck bed, but the second platform also not being supported by any said truck bed side, the second platform also having two second sidewardly extending cantilevered parts, one of said second cantilevered parts extends out over each truck bed side; and,
   the first and second platforms being spaced apart about the distance between front and back one said wheel of the vehicle to be carried on the carrier.

2. The vehicle carrier of claim 1, wherein each cantilevered part has an opening for receiving a wheel of a vehicle to be carried.

3. The vehicle carrier of claim 1, wherein the first platform and the second platform are identical.

4. The vehicle carrier of claim 1, wherein the first and second platforms are spaced apart by a runner adapted to support one said wheel of the vehicle to be carried.

5. The vehicle carrier of claim 4, wherein the platforms are spaced apart by two identical runners.

6. The vehicle carrier of claim 4, which also comprises a loading ramp for the vehicle to be carried, the loading ramp being connected to the second platform at one said second cantilevered part.

7. The vehicle carrier of claim 6, wherein the loading ramp comprises a tailgate extension connected to the second platform and supported by the truck bed tailgate, and a ramp extension rotatably connected to the tailgate extension.

8. The vehicle carrier of claim 1, wherein the truck bed side tops have post holes, and the first and second platforms are spaced apart by anchors having posts which fit into the post holes in the bed side tops.

9. The vehicle carrier of claim 8, wherein the anchors are adjustable.

10. A vehicle carrier for a pickup truck bed, the truck bed having two sides with each side having a top, and the truck bed having a tailgate, the carrier comprising:
    a set of first and second platforms, each platform for laying across and being supported by the truck bed, each platform having a central top lowered part, two raised parts with each raised part being adapted to cooperate with and straddle the top of one said truck bed side, and two outside lowered parts, both the central and the outside lowered parts being adapted to receive and support front and back wheels of vehicles to be carried on the carrier; and,
    the first and second platforms being spaced apart about the distance between the front and back wheels of one said vehicle to be carried on the carrier.

11. The vehicle carrier of claim 10, wherein each platform lowered part has an opening for receiving one said wheel of one said vehicle to be carried.

12. The vehicle carrier of claim 10, wherein the first and second platforms are identical.

13. The vehicle carrier of claim 10, wherein the first and second platforms are spaced apart by a runner adapted to support one said wheel of one said vehicle to be carried.

14. The vehicle carrier of claim 13, wherein the platforms are spaced apart by two identical runners.

15. The vehicle carrier of claim 13, which also comprises a loading ramp for the vehicle to be carried, the loading ramp being connected to the second platform at one said outside lowered part.

16. The vehicle carrier of claim 15, wherein the loading ramp comprises a tailgate extension connected to the second platform and supported by the truck bed tailgate, and a ramp extension rotatably connected to the tailgate extension.

17. The vehicle carrier of claim 10, wherein the truck bed side tops have post holes, and the first and second platforms are spaced apart by anchors having posts which fit into the post holes in the bed side tops.

18. The vehicle carrier of claim 17, wherein the anchors are adjustable.

19. The vehicle carrier of claim 10, wherein the first and second platforms are not supported by the truck bed sides.

20. The vehicle carrier of claim 10, wherein the first and second platforms each have a central downwardly extending part which contacts and is supported by the truck bed bottom.

21. A platform for a vehicle carrier for a pickup truck bed, the truck bed having two sides with each side having a top, the carrier comprising:

a central top lowered part;

two raised parts with each raised part being adapted to cooperate with and straddle the top of a truck bed side; and, two outside lowered parts with both the central and the outside lowered parts being adapted to receive and support the wheels of vehicles to be carried on the carrier.

22. The platform of claim 21 which also comprises a central downwardly extending part which contacts and is supported by the truck bed bottom.

* * * * *